United States Patent [19]

Makiyama

[11] Patent Number: 5,243,586
[45] Date of Patent: Sep. 7, 1993

[54] APPARATUS FOR RETRIEVING A TRACK ON A RECORDING MEDIUM BY A LIGHT BEAM

[75] Inventor: Yutaka Makiyama, Yokohama, Japan

[73] Assignee: Nikon Corporation, Tokyo, Japan

[21] Appl. No.: 856,882

[22] Filed: Mar. 24, 1992

Related U.S. Application Data

[63] Continuation of Ser. No. 505,982, Apr. 6, 1990, abandoned.

[30] Foreign Application Priority Data

Apr. 7, 1989 [JP] Japan .................... 1-86988

[51] Int. Cl.$^5$ .................... G11B 5/09; G11B 15/52; G11B 20/12; G11B 27/22
[52] U.S. Cl. .................................... 369/48; 369/32
[58] Field of Search ................ 369/32, 33, 48, 43, 369/44.25, 44.28, 44.29, 44.11, 44.32, 44.41, 44.34, 54; 360/78.06, 78.08, 78.09

[56] References Cited

U.S. PATENT DOCUMENTS

| | | | |
|---|---|---|---|
| 4,835,752 | 5/1989 | Nakatsu et al. | 369/32 |
| 4,868,819 | 9/1989 | Kimura | 369/32 |
| 4,955,009 | 9/1990 | Nakatsu et al. | 369/32 |

*Primary Examiner*—Tommy Chin
*Assistant Examiner*—Robert Chevalier
*Attorney, Agent, or Firm*—Michael N. Meller

[57] ABSTRACT

In an optical or magneto-optical recording and/or reproducing apparatus, an apparatus for locating a predesignated one of a large number of tracks on the recording medium by a light beam at a high speed during signal recording, reproduction or erasure. The light beam irradiated on the recording medium is swept in the direction of traversing the tracks, the reflected light of the light beam from the recording medium is detected by a photodetector, and a predesignated one of the tracks is retrieved on the basis of the results of detection of the reflected light. The sweeping movement of the light beam is controlled by feedback control of the track traverse velocity of the light beam prevailing until the beam gets to the predesignated track. The velocity detection system for detecting the track traverse velocity is provided with a pulse generator for generating, on the basis of the detection signal by the photodetector, an m number of pulses per on n number of tracks traversed by the light beam until it gets to the predesignated track, a counter for measuring the period of the generated pulse and a velocity computing circuit for computing, on the basis of the count value by the counter, the track traverse velocity of the light beam prevailing until the beam gets to the predesignated track.

4 Claims, 2 Drawing Sheets

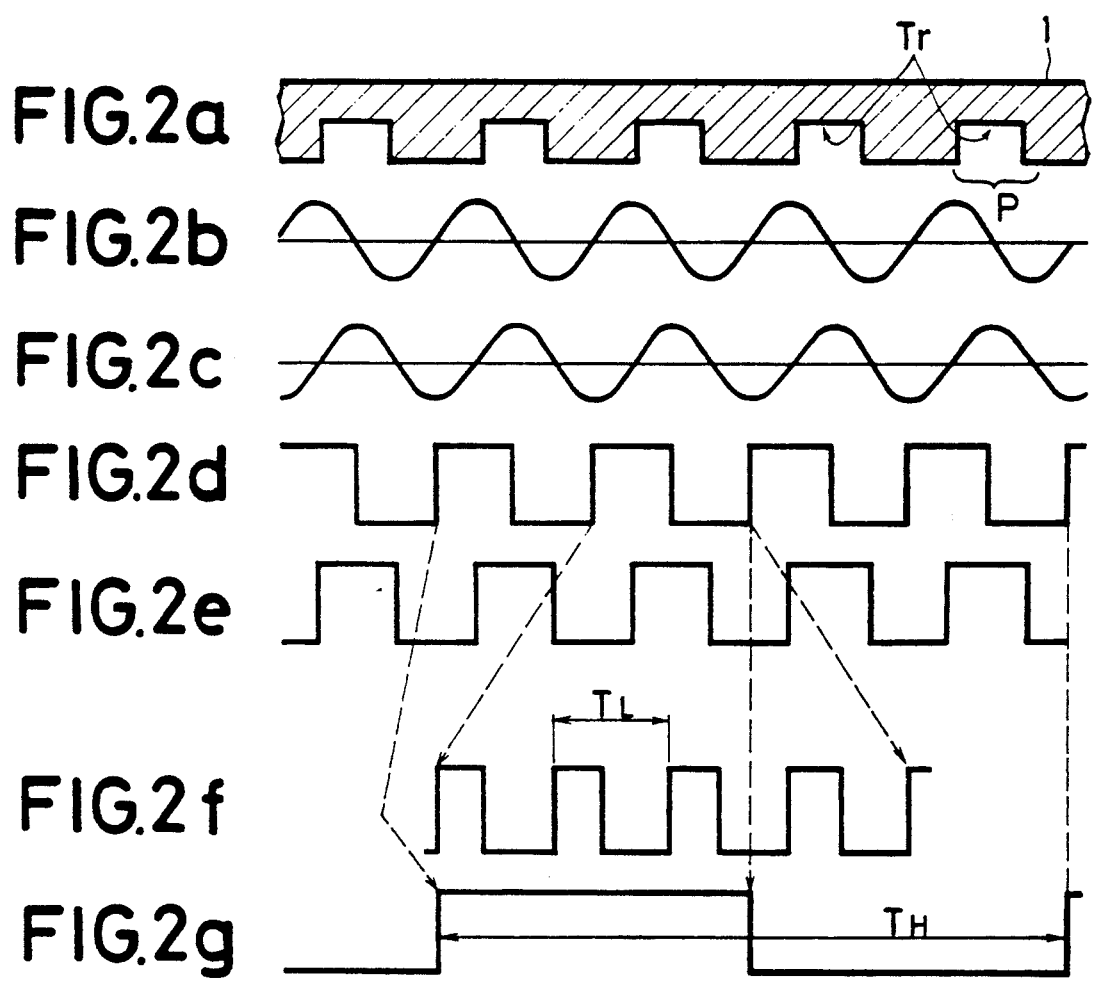

APPARATUS FOR RETRIEVING A TRACK ON A RECORDING MEDIUM BY A LIGHT BEAM

This application is a continuation of application Ser. No. 505,982, filed Apr. 6, 1990, now abandoned.

BACKGROUND OF THE INVENTION

1. Field of the Invention

This invention relates to an apparatus for retrieving a track on a recording medium by a light beam. For example, it relates to an apparatus, in an optical or magneto-optical recording/reproducing system, in which a predesignated one of a large number of tracks on the recording medium may be located by a light beam at an elevated speed during signal recording, reproduction or erasure. Above all, when the beam shifting or movement for sweeping is controlled on the basis of feedback control by the track traverse velocity during the time the light beam is moved to the pre-designated track, an improvement on the velocity detection circuit for detecting the track traverse velocity is comprised within the technical field of the present invention.

2. Description of the Prior Art

An example of this type of the known track retrieval apparatus is disclosed in the JP Patent KOKOKU Publication No. SHO-63-46511.

The outline of this conventional track retrieving apparatus is hereinafter briefly explained. A movable carriage mounts an optical system for collimating the light from a light source, such as a laser diode, and outputting the collimated beam. By relative movement of the carriage with respect to the recording medium, the recorded or unrecorded tracks on the recording medium are swept in the track traversing direction by the outgoing light beam from the optical system.

On the other hand, the reflected light of the light beam reflected by the recording medium is detected by a photodetector provided on the carriage. The detected signal is processed in a predetermined manner, as described subsequently, for effecting feedback control of the velocity of the carriage movement for irradiating the light beam on one predesignated track, that is, for retrieving the designated track.

Meanwhile, the medium is in the form of a disk or a rectangle, while the tracks are in the form of straight lines, concentric circles or helices.

Throughout the present specification, the number n of the tracks traversed by the light beam means the number of tracks traversed by the light beam travelling in the direction normal to the tracks or in the radial direction of the recording medium when the tracks are in the form of straight lines or concentric circles, and the number of times the track is traversed by the light beam travelling along the radius of the track when the tracks are in the form of helices. The number of tracks means the number of separate tracks when the tracks are in the form of straight lines or concentric circles, and the number of turns of the helix, that is the number of the tracks each of which is assumed to exist from a given point on a track to a separate neighboring point on the adjacent track.

Meanwhile, for the above mentioned control of the carriage velocity it is necessary to detect the velocity with which the light beam traverses the track. With the above described track retrieval apparatus, there is employed, as a means for detecting the track traversing velocity, a combined method consisting of a differentiating detection system which detects the number of tracks or number of times traversed by the light beam on the basis of the photodetection output and differentiates the detected number with respect to time to detect the track traversing velocity and a magnetic detection system for magnetically detecting the carriage velocity.

For detecting the carriage velocity by the magnetic detection system, a velocity detection unit composed of a movable section movable in unison with the carriage and a stationary section fixed at a suitable point in the apparatus is annexed to the carriage. The relative velocity between the movable section and the stationary section stands for the carriage velocity, that is the track traversing velocity of the light beam. The relative velocity between the two sections is taken out from the velocity detection unit as the magnetic signal which is subsequently converted by a suitable converter into an electrical signal.

For velocity detection by the differentiating detection system, a change in the volume of the reflected light when the light beam traverses a track is detected by the photodetector, from the output of which a pulse is generated each time the light beam traverses a track (one pulse per track). The number of times n the light beam traverses the track may be measured by counting the number of the generated pulses. The number of times n of traverse is converted into an analog signal which is then differentiated with respect to time by a differentiating circuit to detect the track traversing velocity of the light beam.

The detected velocity values from the magnetic detection system and the differentiating detection system are selectively switched depending on, for example, the magnitude of the detected velocity, so as to be taken out as the current velocity signal indicating the current track traversing velocity, which current velocity signal is supplied to a driving circuit. This driving circuit transmits a carriage control command signal to a driving element so that the difference between the current velocity signal and a separate command velocity signal will be zero on an average, the driving element in turn controlling the carriage velocity on the basis of the command signal supplied thereto.

The above described prior art system suffers from the following disadvantages.

First, in the magnetic detection system, a velocity detection system for magnetically detecting the travelling velocity of the carriage is necessitated in addition to an electrical circuit. This type of the magnetic velocity detection unit occupies a larger space and is relatively expensive to render the reduction in size and costs of the retrieval apparatus and hence that of the recording-/reproducing apparatus difficult.

On the other hand, with the differentiating detection system, the rate of pulse generation for velocity detection is perpetually one pulse per track, irrespective of the velocity. In such a case, for a low velocity range in which the period of the track traversing velocity becomes longer, a higher detection accuracy may be achieved due to the long sampling time duration for pulse generation, whereas, however, ripples tend to be inconveniently produced as a result of the longer sampling time duration. Conversely, for a high speed range in which the period of the track traversing velocity becomes shorter, the detection accuracy is lowered due to the shorter sampling time interval. In addition, the detection accuracy for the low velocity range is not identical with that for the high velocity range due to the difference in the period of the track traversing velocity which renders it difficult to improve the detection accuracy in the broad velocity range.

SUMMARY OF THE INVENTION

It is a principal object of the present invention to provide a track retrieving apparatus which may be reduced in size and costs. It is also an object of the present invention to suppress ripples in the lower velocity range or to improve the velocity detection accuracy in the higher velocity range as well as to improve the detection accuracy in the broad velocity range in the track retrieval apparatus.

According to a basic aspect of the present invention, there is provided a track retrieving apparatus in which a light beam irradiated on recorded or unrecorded tracks on a recording medium is swept in a direction of traversing the track, the reflected light of said light beam from the recording medium is detected by photodetector means, and in which the movement of the light beam for sweeping is controlled on the basis of the results of detection by said photodetector means by feedback control of the track traversing velocity prevailing during the time the light beam is moved to a predesignated one of said tracks for retrieving said predesignated track. The retrieving apparatus comprises pulse generating means for generating an m number of pulses per an n number of tracks traversed by the light beam shifted to said predesignated track, on the basis of the reflected light detecting signal of said photodetector means, counter means for measuring the periods of the generated pulses, and velocity computing means for computing, on the basis of the count value by said counting means, the track traversing velocity with which the light beam is moved to the predesignated track.

In another aspect of the present invention, the pulse generating means includes two kinds of modes, for example, having different combinations of settings of n and m, and changeover means for switching between these two modes, whereas the velocity computing means include discriminating means for discriminating if the computed velocity is larger or smaller than a preset comparison velocity. The changeover means is controlled on the basis of the results of discrimination by the discriminating means so that the velocity is computed on the basis of the above mentioned count value of the generated pulses for one of the two modes. More specifically, when the track traversing velocity is in the low velocity range, the pulse generating means are set to $n=1$ and $m=4$, whereas, when the track traversing is in the high velocity range, the pulse generating means are set to $n=4$ and $m=1$.

The track traversing velocity of the light beam corresponds to the frequency which is the reciprocal of the period of the track traversing signal of the light beam. Hence, if the period of the track traversing signal is detected, the track traversing velocity may be found by an arithmetic operation. Thus, with the track retrieval apparatus of the present invention, the period of the m number of pulses generated by the pulse generating means each time the light beam traverses the n number of tracks, that is the track traversing signals of the light beam, is measured by counter means and the track traversing velocity is computed based on the count value. With a system of the present invention, the magnetic detection means as employed in the above mentioned conventional system may be eliminated and the velocity detection circuit may be comprised by an electrical circuit mainly composed of digital circuits such as counter (counter means) or arithmetic processors (velocity computing means).

With the track retrieving apparatus of the present invention, the sampling time interval is sufficiently long for the low velocity range in which the period of the track traversing velocity is longer, so that a high detection accuracy can be assured even if the sampling time interval is shortened to a certain degree. A high detection accuracy may be assured even when the setting of n and m is $n=1$ and $m=4$ (this setting is designated hereinafter as setting mode I) to effect velocity detection based on the measurement of pulse periods for form pulses per track. When the sampling time interval is shortened in this manner, the effect of ripple suppression is improved, while the arrangement of the filter means for ripple suppression may be simplified or eliminated.

On the other hand, the sampling time interval is shorter for the low velocity range in which the period of the track traversing velocity is shorter, so that the detection accuracy becomes lower for the setting such as the setting mode I. Thus the detection accuracy may be improved by using the setting of n and m of $n=4$ and $m=1$ (this setting is designated hereinafter as setting mode II) to effect velocity detection based on the measurement of pulse periods for one pulse per four tracks.

Alternatively, if the two kinds of modes with different settings of n and m are provided as the setting modes for n and m, and one of these modes is switchingly selected depending on whether the computed velocity from velocity computing means is higher or lower than a preset comparison velocity, it becomes possible to achieve desired results for both low and high velocity ranges by suitably presetting the comparison speed and the setting mode. This may be realized in the following manner.

The above mentioned setting modes I and II are adopted as the two kinds of modes and the average velocity under the ordinary operating state is adopted as the comparison velocity. Mode switching is so made that the setting mode I is selected when the velocity computed by the velocity computing means is smaller than the average velocity, that is a lower velocity, and the setting mode II is selected when the velocity computed by the computing means is larger than the average velocity, that is a higher velocity. By again computing the velocity on the basis of the selected mode, the high detection accuracy for the low velocity range, ripple suppression due to the shortened sampling time interval and the high detection accuracy for the high velocity may be assured simultaneously.

According to the present invention by detecting the sweeping velocity in the track traversing velocity of the light beam from the period of the track traversing signal, high accuracy velocity detection may be achieved in a shorter time.

With a mode setting of generating pulses of $m>n$, ripple suppression in the low velocity range may be achieved, whereas, with a mode setting of generating pulse of $m<n$, velocity detection accuracy for the high velocity range may be improved.

On the other hand, when two kinds of modes, that is the high and low velocity pulse generating modes, are provided, and are switchingly selected depending on the detected velocity, it becomes possible to perform the velocity detecting arithmetic operations for the low velocity range and the high velocity range under optimum conditions and to match the dynamic ranges for the detection accuracy and the detection band with respect to the low velocity and high velocity ranges.

In any of the arrangements, magnetic velocity detection units such as those used heretofore may be eliminated, and the velocity detection circuit may be constituted by electrical circuits mainly composed of digital circuits such as general-purpose arithmetic processors or counters, so that, by arranging the velocity detection circuits as ICs or LSIs, it becomes possible to reduce the size and costs of the track retrieving apparatus and hence the recording/reproducing system.

For further classifying the features and advantages of the present invention, a preferred embodiment of the present invention will be explained by referring to the accompanying drawings.

BRIEF DESCRIPTION OF THE DRAWINGS

FIG. 1 is a block diagram showing the arrangement of main portions of a track retrieving apparatus according to an embodiment of the present invention and FIGS. 2a to 2g are timing charts for illustrating the generation of the period measuring pulse in the arrangement shown in FIG. 1.

DESCRIPTION OF THE PREFERRED EMBODIMENTS

Figure 1:
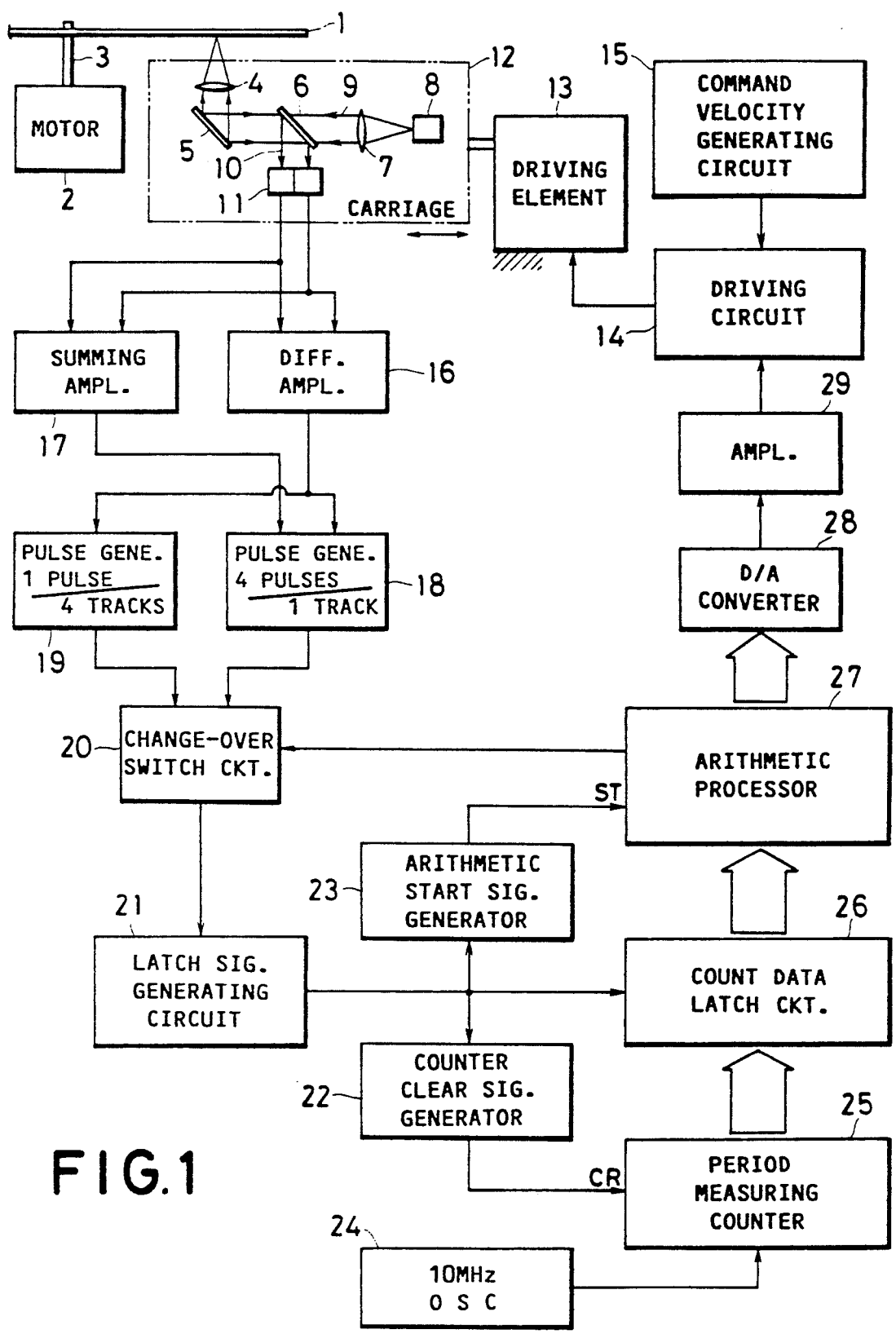

FIG. 1 illustrates the arrangement of the major portion of a track retrieving apparatus according to an embodiment of the present invention. The following description is mainly directed to a velocity detection circuit characteristic of the present invention, while the other portions of the apparatus not shown herein are not described for simplicity.

In the drawings, a disk or recording medium 1 is an optical or magneto-optical disk on which a number of concentric tracks are formed. In the present embodiment, the disk 1 is rotated about a rotary axis 3 under the driving of an electric motor 2, and a designated track is retrieved during disk rotation.

A movable carriage (transfer deck) 12 mounts a light source 8, such as a laser diode, and an optical system 4 to 7 for collimating the light from the light source 8. By relative movement of the carriage 12 with respect to the disk 1 as shown by an arrow shown in FIG. 1, prerecorded or unrecorded tracks on the disk may be swept or scanned in the track traversing direction, that is along the radius of the disk 1, with the outgoing light beam from the optical system.

A light beam 9 generated by the light source 8 is collimated by a coupling lens 7 to form a collimated light beam which is then passed via half mirror 6 and reflective mirror 5 to fall on a converging lens 4 so as to be converged on the disk 1.

A reflected light 10 reflected from the disk 1 is taken out from half mirror 6 via converging lens 4 and reflective mirror 5 in the aforementioned optical system so as to be detected by a photosensor (photodetector means) 11 provided in the carriage 12. By processing the detection signal in the predetermined manner as will be mentioned subsequently, the shifting speed of the carriage 12 is controlled in such a manner that the light beam may be irradiated on a pre-designated track, that is, in such a manner that retrieval of the designated track may be achieved.

The photodetector 11 is divided into two equal detection portions, with the division line being along the track length in the track pattern contained in the reflected light. The output voltage signals from these two equal portions of the photodetector 11 are supplied to a differential amplifier 16 where the difference therebetween is computed to produce a difference signal which is output from the differential amplifier 16.

The two output voltage signals from the two portions of the photodetector 11 are also supplied to a summing amplifier 17. The outputs from the differential amplifier 16 and the summing amplifier 17 are supplied to a four-pulse-per-track pulse generator for low speed mode 18 (setting mode I pulse generator).

The output of the differential amplifier 16 is also supplied to a one-pulse-per-four-track pulse generator for high speed mode 19 (setting mode II pulse generator).

FIGS. 2a to 2g show timing charts for signals for generating measurement pulses, wherein the cross-sectional profile of the disk 1 in the radial direction is shown at FIG. 2a. The waveform in FIG. 2b designates an output signal waveform of the differential amplifier 16, the waveform in FIG. 2c an output signal waveform of the summing amplifier 17, the waveform in FIG. 2d a binary signal waveform converted from waveform of FIG. 2b, the waveform in FIG. 2e a binary signal waveform converted from waveform of FIG. 2c, the waveform in FIG. 2f an output signal waveform of the four-pulse-per-track pulse generator 18 and the waveform in FIG. 2g an output signal waveform of the one-pulse-per-four-track pulse generator 19, respectively.

By simultaneously referring to FIGS. 2a to 2g, the embodiment shown in FIG. 1 is explained. The outputs of the generators 18 and 19 are supplied to the changeover switching circuit 20 which selectively outputs one of these two generator outputs. The output of the changeover switch 20 is supplied to a latch signal generator 21. The output of the latch signal generator 21 is supplied to a count data latch circuit 26 for holding output data of a period measuring counter 25, while being simultaneously to a counter clear signal generator 22 and an arithmetic start signal generator 23. The arithmetic start signal generator 23 is designed to supply a command pulse of starting the velocity-computing arithmetic operation to an arithmetic processor (velocity computing means 27 which will be explained subsequently.)

The period measuring counter 25 counts up output 10 MHz clock pulses of a 10 MHz oscillator 24, with the count value being reset to zero by an output pulse of the counter clear signal generator 22. The count value of the period measuring counter 25 immediately before resetting to zero is held in the counter data latch circuit 26 by the output pulse of the latch signal generator 21.

On reception of the output pulse of the arithmetic start signal generator 23, the arithmetic processor 27 fetches the period count value held at the count data latch circuit 26, executes an arithmetic operation of finding the velocity from the period and outputs velocity-indicating data. The output data are converted by a D/A converter 28 into an analog velocity signal, which is amplified by an amplifier 29. The output of the amplifier 29 is the current velocity signal of the present invention. The current velocity signal is supplied to the driving circuit 14 which then transmits a carriage control command to driving element 13 so that the difference between the abovementioned current velocity signal and a command velocity signal separately supplied from command velocity generating circuit 15 will become zero on an average. The driving element 13 controls the travelling speed of the carriage 12 on the basis of the carriage control command signal supplied thereto.

Meanwhile, in the embodiment shown in FIG. 1, there are provided two velocity detection modes, that is a low velocity mode (setting mode I) and a high velocity mode (setting mode II). The speed detection in each mode and the mode switching are performed in the following manner.

(I) Low Velocity Mode

Four pulses are supplied to latch signal, generator 21, as shown at the waveforms in FIGS. 2d, 2e and 2f, each time a track is traversed. The velocity to be computed in the arithmetic processor 27 on the basis of the count data produced at the period measuring counter 25 within a period $T_L$ indicated in the waveform of FIG. 2f.

(II) High Speed Mode

One pulse is supplied to latch signal generator 21, as shown at the waveforms in FIGS. 2d and 2g, each time four tracks are traversed, and the velocity is computed by the arithmetic processor 27 on the basis of the count data produced by the period measuring counter 25 within the period $T_H$ shown in FIG. 2g.

(III) Mode Switching

Switching between the low speed mode and the high speed mode is executed by comparing the result of the arithmetic operation in the arithmetic processor 27 with preset comparison velocity data in the arithmetic processor 27 such as average velocity data under the normally operating state. That is when the result of the arithmetic operation in the arithmetic processor 27 is larger or smaller than the comparison velocity data, the high velocity mode or the low velocity mode is set by changeover switching circuit 20, respectively.

The following Table 1 tabulates the precision in velocity detection with the present embodiment.

TABLE 1

| Item | Law Velocity Detection Mode | | High Velocity Detection Mode | |
|---|---|---|---|---|
| | 4(mm/sec) | 64(mm/sec) | 64(mm/sec) | 1024(mm/sec) |
| Sampling Interval (μsec) | 100 | 6.2 | 100 | 6.2 |
| Period Count Value | 1000 | 62 | 1000 | 62 |
| Accuracy (%) | 0.1 | 1.6 | 0.1 | 1.6 |
| Frequency Range (kHz) (from sampling theorem) | 5.0 | 80.6 | 5.0 | 80.6 |

In Table 1, the low and the high velocity ranges of the velocity with which the light beam travels on the disk surface are 4 to 64 mm/sec and 64 to 1024 mm/sec, respectively. As shown in FIG. 2a, the pitch P of a track Tr formed on the disk 1 is 1.6 μm.

The output frequency $f_0$ of the differential amplifier 16 and the summing amplifier 17 is 2.5 to 40 kHz and 40 to 640 kHz for the low velocity range and the high velocity range, respectively, while the period $T_0$ is 400 to 25 μsec and 25 to 1.56 μsec for the low velocity range and the high velocity range, respectively.

Thus the time intervals during which the output pulse of the 10 MHz oscillator 24 is counted by the period measuring counter 25, that is the time interval $T_L$ for the low velocity range and the time interval $T_H$ for the high velocity range, are $T_L = 100$ to 6.2 μsec, and $T_H = 100$ to 6.2 μsec, these indicating the sampling intervals shown in Table 1. Since the sampling frequency is 10 MHz, the numbers of periods $N_L$ and $N_H$ counted within the sampling interval $T_L$ or $T_H$, respectively, are $N_L = 1000$ to 62 and $N_H = 1000$ to 62 for the low velocity range and the high velocity range, respectively.

Hence, if the quantization error of ±1 count is taken into consideration, the accuracy in period measurement is 0.1 to 1.6% (1/1000 to 1/62) for both the low and high velocity ranges. Such a high measurement accuracy means that, if a sufficiently high computing accuracy is employed, it becomes possible to achieve velocity detection at a higher accuracy. By employing a high accuracy high speed computing type arithmetic processor 27, it becomes possible to compute the velocity with high accuracy and at a high rate.

On the other hand, it may be said that sufficient response characteristics necessary for the velocity control of the carriage 12 may be assured, since the output bandwidth of the D/A converter 28 for the sampling interval $T_L$ or $T_H$ of 5 to 80.6 kHz may be obtained, as shown in Table 1.

As explained with reference to FIGS. 1 and 2a to 2g and Table 1, it becomes possible to improve ripple suppressing accuracy for the low velocity range, with the velocity detection accuracy being maintained at a higher value, as well as to achieve high accuracy velocity detection for the high velocity range.

In the above described embodiment, the disk 1 having concentric tracks formed thereon is used as the recording medium. However, the present invention is not limited thereto but may be applied to various other forms of the recording media and tracks as set out in the above given description of the prior art system.

Although the velocity is detected from the period of the output pulse of the one-pulse-per-four-track generating circuit 19 in the above embodiment, the period of the one-pulse per-one-track signal may be measured for four pulses to detect the velocity from the four periods.

Although the setting modes I and II as the pulse generating modes are selectively switched in the above embodiment, the system may be provided with only one of the setting modes, if so desired. The setting conditions for the setting modes in such case are n>m if solely the high velocity mode is provided and m>n if solely the low velocity mode is provided, wherein n indicates the generated pulses. It is to be noted that the setting for m and n is not limited to that shown in the above embodiment. For example, if there are two set modes and only one of them should be selected in dependence upon the velocity, one of the set modes may be m=n.

In addition, any other form of the velocity detection circuit may be adopted without departing from the purport of the present invention. For example, a pulse generating circuit usually annexed to this type of the track retrieving system for detecting the track traverse data for the purpose of performing tracking control of the light beam may be used simultaneously as the pulse generating means of the present invention. Such arrangement may maturally be comprised within the scope of the claim of the present invention.

what is claimed is:

1. A track retrieving apparatus in which a light beam irradiated on recorded or unrecorded tracks on a recording medium is scanned in a direction of traversing the tracks, a reflected light of said light beam from said recording medium is detected by photodetector means, and in which a movement of said light beam for scanning is controlled on the basis of results of detection by said photodetector means by feedback control of a track traversing velocity prevailing during a time the light beam is moved to a pre-designated one of said tracks, for retrieving said pre-designated track, said apparatus comprising:

pulse generating means for generating an m integer number of pulses per an n integer number of said tracks traversed by said light beam while the light beam is shifted to said pre-designated track, on the basis of the reflected light detection signal of said photodetector means;

said pulse generating means including first and second mode pulse generating means having different combinations of setting for said m integer number and said n integer number and at least one of said first and second mode pulse generating means being set to m not equal to n, and changeover means for selecting between output pules of said first and second mode pulse generating means;

counter means for measuring length of periods of the selected pulses by a high frequency clock pulse; and velocity computing means for computing, on a basis of a count value by said counter means, the track traversing velocity with which said light beam is moved to said pre-designated track, said velocity computing means including discriminating means for discriminating whether the computed velocity is larger or smaller than a preset comparison velocity to control said changeover means in accordance with results of said discriminating means, whereby the computation is made on the basis of said count value of the output pulses from one of said first and second mode pulse generating means.

2. The track retrieveing apparatus according to claim 1 wherein one of said first mode pulse generating means or said second mode pulse generating means is set to $n<m$ and the other is set to $n=m$.

3. The track retrieveing apparatus according to claim 1 wherein one of said first mode pulse generating means or said second mode pulse generating means is set to $n>m$ and the other is set to $n=m$.

4. The track retrieveing apparatus according to claim 1 wherein one of said first mode pulse generating said second mode pulse generating means is set to $n<m$ and the other is set to $n>m$.

* * * * *